(12) United States Patent
Bhanushali et al.

(10) Patent No.: US 11,126,509 B2
(45) Date of Patent: Sep. 21, 2021

(54) METHOD AND SYSTEM FOR EFFICIENT RESOURCE USAGE THROUGH INTELLIGENT REPORTING

(71) Applicant: EMC IP Holding Company LLC, Hopkinton, MA (US)

(72) Inventors: Jigar Premjibhai Bhanushali, Valsad (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 257 days.

(21) Appl. No.: 16/523,033

(22) Filed: Jul. 26, 2019

(65) Prior Publication Data
US 2021/0026742 A1    Jan. 28, 2021

(51) Int. Cl.
*G06F 11/14*       (2006.01)
*G06F 11/34*       (2006.01)

(52) U.S. Cl.
CPC ...... *G06F 11/1466* (2013.01); *G06F 11/1464* (2013.01); *G06F 11/1469* (2013.01); *G06F 11/3419* (2013.01); *G06F 2201/81* (2013.01)

(58) Field of Classification Search
CPC ............. G06F 11/1466; G06F 11/1469; G06F 11/1464; G06F 11/3419; G06F 2201/81
See application file for complete search history.

(56) References Cited

U.S. PATENT DOCUMENTS

| | | | | |
|---|---|---|---|---|
| 2007/0294495 | A1* | 12/2007 | Uchida | G06F 11/1451 711/162 |
| 2008/0178185 | A1* | 7/2008 | Okada | H04L 69/40 718/103 |
| 2017/0242871 | A1* | 8/2017 | Kilaru | G06F 11/2094 |

\* cited by examiner

*Primary Examiner* — Nadeem Iqbal
(74) *Attorney, Agent, or Firm* — Chamberlain, Hrdlicka, White, Williams & Aughtry

(57) ABSTRACT

A method and system for efficient resource usage through intelligent reporting. Specifically, the method and system disclosed herein entail implementing resource-efficient messaging between computing systems engaging in centralized restore operations. A centralized restore operation may refer to the initiation and management of the restoration of data on a remote computing system from a local computing system. Further, conventional management of a centralized restore operation necessitates frequent reporting on the state of the restoration process, which may inefficiently expend memory and network resources.

20 Claims, 4 Drawing Sheets

METHOD AND SYSTEM FOR EFFICIENT RESOURCE USAGE THROUGH INTELLIGENT REPORTING

BACKGROUND

Centralized restore refers to a solution in which restore operations may be performed on any remote host, in a cluster of hosts, from a local host. Normally, the restore operation alone, entailing the transfer of data from a storage system to the remote host, already strains the limited network bandwidth shared amongst the host cluster. Centralized restore, however, further depletes the shared network bandwidth due to frequent communications between the local host and the remote host, which may be used to coordinate the restore operation, as well as report the progress thereof.

SUMMARY

In general, in one aspect, the invention relates to a method for resource-efficient messaging. The method includes receiving a restoration instruction from a remote client device, initiating, on a local client device, a restore operation in response to the restoration instruction, monitoring a timer tracking an elapsed time since an initiation of the restore operation, making a first determination that the elapsed time matches one selected from a group consisting of a threshold restoration duration and a threshold restoration duration interval, based on the first determination, generating a first restoration status message, and transmitting the first restoration status message to the remote client device.

In general, in one aspect, the invention relates to a system. The system includes a first client device including a first computer processor configured to receive a restoration instruction, initiate, on the first client device, a restore operation in response to the restoration instruction, monitor a timer tracking an elapsed time since an initiation of the restore operation, make a determination that the elapsed time matches one selected from a group consisting of a threshold restoration duration and a threshold restoration duration interval, based on the determination, generate a restoration status message, and transmit the restoration status message.

In general, in one aspect, the invention relates to a non-transitory computer readable medium (CRM). The CRM includes computer readable program code, which when executed by a computer processor, enables the computer processor to receive a restoration instruction from a remote client device, initiate, on a local client device, a restore operation in response to the restoration instruction, monitor a timer tracking an elapsed time since an initiation of the restore operation, make a first determination that the elapsed time matches one selected from a group consisting of a threshold restoration duration and a threshold restoration duration interval, based on the first determination, generate a first restoration status message, and transmit the first restoration status message to the remote client device.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for efficient resource usage through intelligent reporting. Specifically, one or more embodiments of the invention entails implementing resource-efficient messaging between computing systems engaging in centralized restore operations. A centralized restore operation may refer to the initiation and management of the restoration of data on a remote computing system from a local computing system. Further, conventional management of a centralized restore operation necessitates frequent reporting on the state of the restoration process, which may inefficiently expend memory and network resources.

Figure 1:
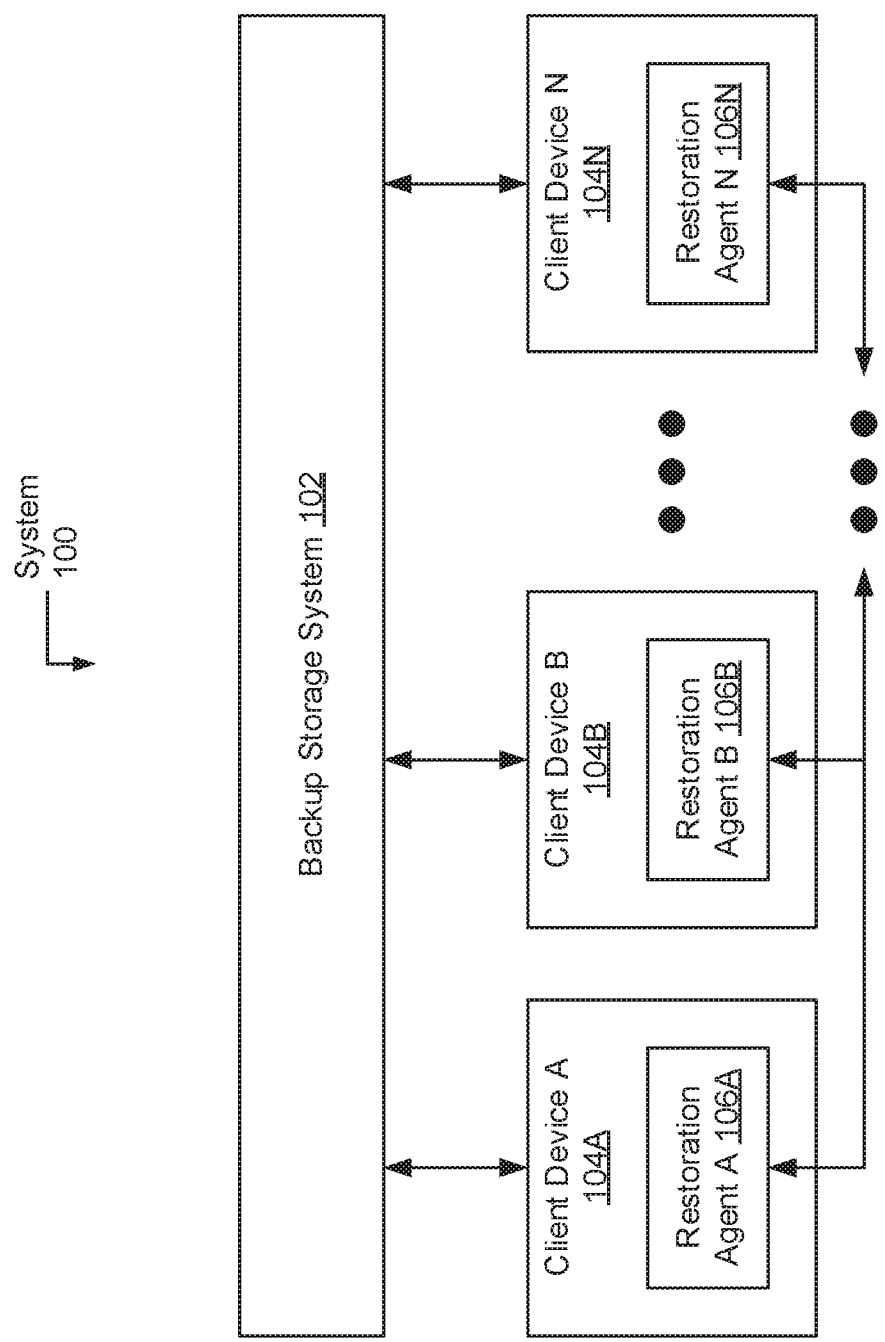
FIG. 1 shows a system in accordance with one or more embodiments of the invention.

FIG. 1 shows a system in accordance with one or more embodiments of the invention. The system (100) may include a backup storage system (102) operatively connected to two or more client devices (104A-104N). Each of these system (100) components is described below.

In one embodiment of the invention, the above-mentioned system (100) components may operatively connect to one another through a network (not shown) (e.g., a local area network (LAN), a wide array network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the backup storage system (102) may represent a data backup, archiving, and/or disaster recovery storage system. The backup storage system (102) may be implemented using one or more servers (not shown). Each server may be a physical server, which may reside in a datacenter, or a virtual server, which may reside in a cloud computing environment. Additionally or alternatively, the backup storage system (102) may be implemented using one or more computing systems similar to the exemplary computing system shown in FIG. 3.

In one embodiment of the invention, the backup storage system (102) may include a physical storage array (not shown). The physical storage array may refer to a collection of one or more physical storage devices (not shown) on which various forms of data—e.g., backup copies of data found on the client device(s) (104A-104N)—may be consolidated. Each physical storage device may encompass non-transitory computer readable storage media on which data may be stored in whole or in part, and temporarily or permanently. Further, each physical storage device may be designed and configured based on a common or different storage device technology examples of which may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, any subset or all physical storage devices may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a client device (104A-104N) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, a client device (104A-104N) may include and allocate various resources (e.g., computer processors, memory, storage, virtualization, network bandwidth, etc.), as needed, to the computer programs and the tasks (or processes) instantiated thereby. One of ordinary skill will appreciate that a client device (104A-104N) may perform other functionalities without departing from the scope of the invention, Examples of a client device (104A-104N) may include, but are not limited to, a desktop computer, a laptop computer, a tablet computer, a server, a mainframe, or any other computing system similar to the exemplary computing system shown in FIG. 3.

In one embodiment of the invention, one of the client devices (e.g., 104A) may perform the role of a master client device, whereas each of the remaining client device(s) (e.g., 104B-104N) may perform the role of a slave client device. The master client device (e.g., 104A) may refer to a client device wherefrom centralized restore operations, across the various client devices (104A-104N), may be coordinated. A slave client device (e.g., 104B-104N), on the other hand, may refer to a client device on which restore operations may be remotely invoked. Furthermore, a centralized restore operation may refer to the initiation and management of the restoration of data on any slave client device (e.g., 104B-104N) from the master client device (e.g., 104A).

In one embodiment of the invention, each client device (104A-104N) may include a restoration agent (106A-106N) installed thereon. A restoration agent (106A-106N) may refer to a computer program that may execute on the underlying hardware of a client device (104A-104N). Specifically, a restoration agent (106A-106N) may be designed and configured to manage restore operations, which may entail overseeing data transfers from the backup storage system (102) to the client device (104A-104N) on which the restoration agent (106A-106N) is installed should the client device (104A-104N) perform the role of a slave client device. To that extent, a restoration agent (106A-106N), on a slave client device, may perform any subset or all of the flowchart steps outlined in FIGS. 2A and 2B. Alternatively, a restoration agent (106A-106N) may be designed and configured to coordinate centralized restore operations (described above), across the system (100), should the client device (104A-104N), on which the restoration agent (106A-106N) is installed, should perform the role of the master client device.

Figure 2A:
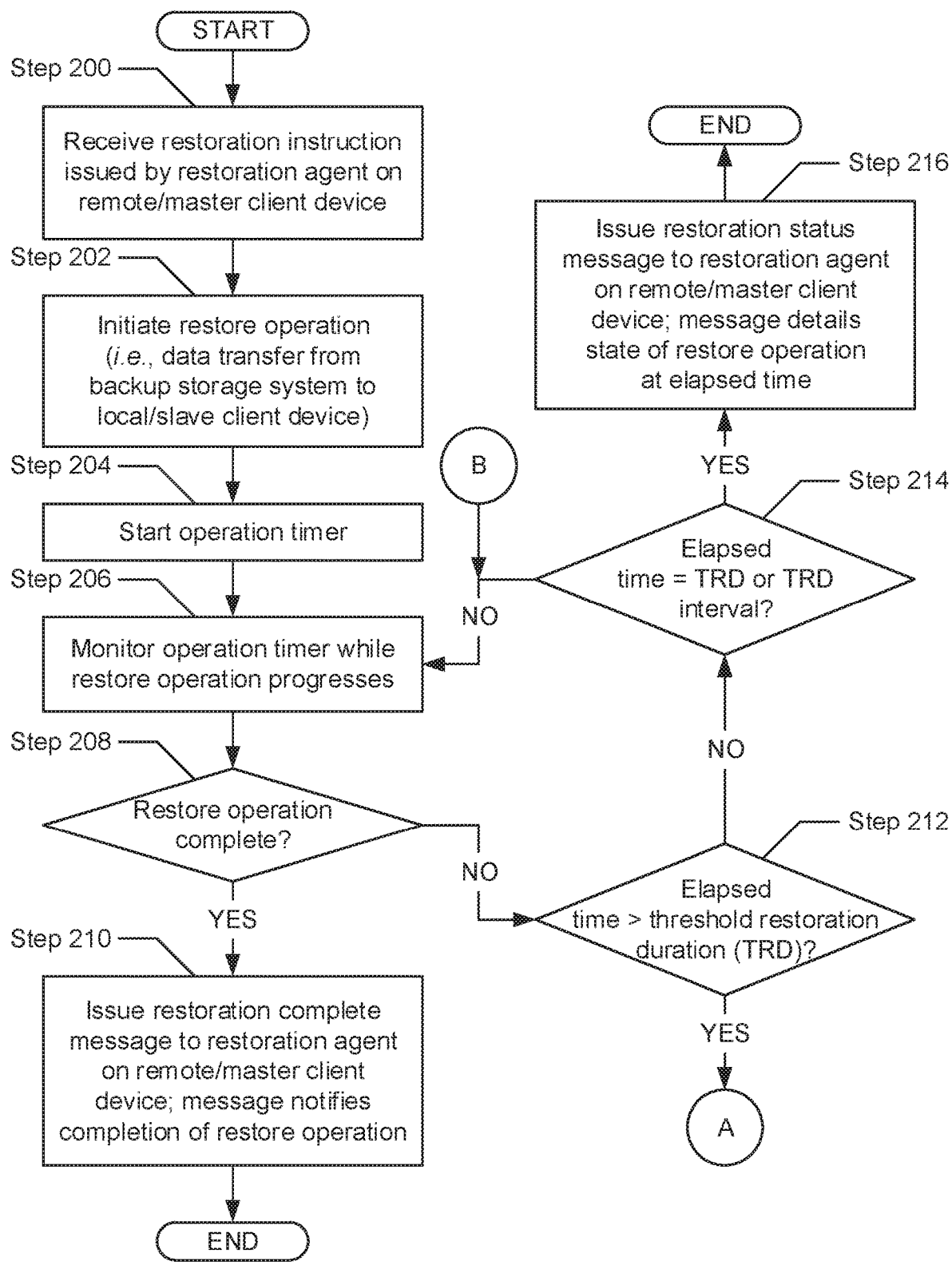
FIGS. 2A and 2B show flowcharts describing a method for efficient resource usage through intelligent reporting in accordance with one or more embodiments of the invention.
Figure 2B:
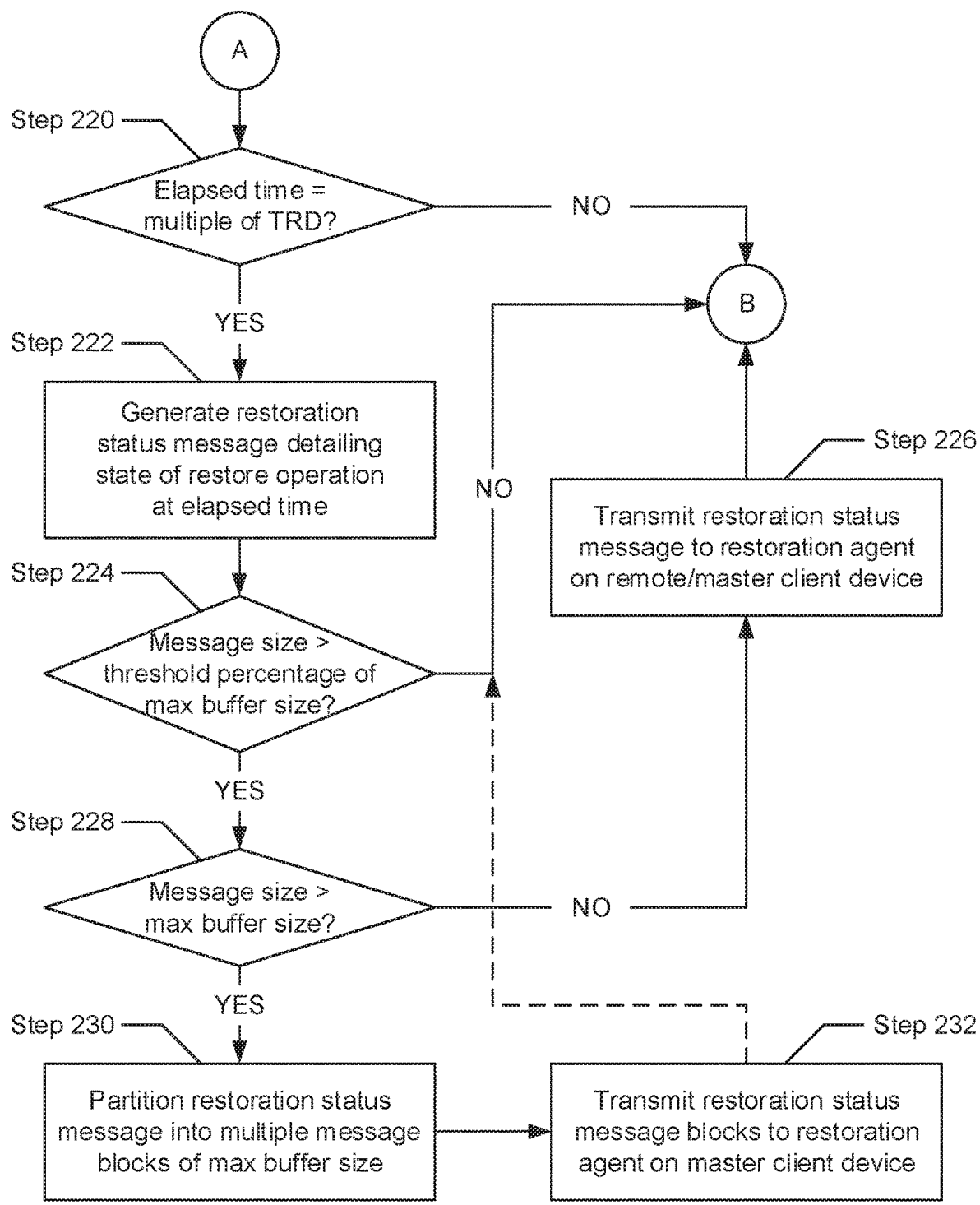

While FIG. 1 shows a configuration of components, other system configurations may be used without departing from the scope of the invention, FIGS. 2A and 2B show flowcharts describing a method for efficient resource usage through intelligent reporting in accordance with one or more embodiments of the invention. The various steps outlined below may be performed by the restoration agent residing on a slave client device (see e.g., HG. Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a restoration instruction is received. In one embodiment of the invention, the restoration instruction may pertain to performing a restore operation on a local, slave client device (described above—see e.g., FIG. 1) and may have been issued by a restoration agent executing on a remote, master client device. The restoration instruction may include, but is not limited to, an asset (or database) identifier or name associated with the asset sought to be restored; an asset source storage location disclosing the directory path in which the asset is stored in the backup storage system; an asset destination storage location assigning the directory path in which the asset should be stored, upon restoration, on the slave client device; and version selection criteria (e.g., last successful full backup, golden copy backup, backup corresponding to a given timestamp, etc.) that may be used to identify the correct version of the asset sought to be restored.

In Step 202, in response to the restoration instruction (received in Step 200), a restore operation is initiated on the local, slave client device. In one embodiment of the invention, the restore operation may entail the transfer of data, across a network, from the backup storage system to the local, slave client device. Further, the restore operation may be initiated based on request-reply communications between the backup storage system and the local, slave client device at least based on any subset or all of the above-mentioned asset information received along with the restoration instruction.

In Step 204, an operation timer is initialized and started. In one embodiment of the invention, the operation timer may represent a physical or virtual clock that may be used to track time that has elapsed since the initiation of the restore operation (in Step 202). In Step 206, the operation timer (initialized and started in Step 204) is monitored while the restore operation (initiated in Step 202) progresses on the local, slave client device.

In Step 208, a determination is made as to whether the restore operation (initiated in Step 202) has successfully completed. The determination may entail, for example, the receipt of an end-of-transfer message from the backup storage system. Accordingly, in one embodiment of the invention, if it is determined that the restore operation has successfully completed, then the process proceeds to Step 210. On the other hand, in another embodiment of the invention, if it is alternatively determined that the restore operation is still ongoing or underway, then the process alternatively proceeds to Step 212.

In Step 210, after determining (in Step 208) that the restore operation (initiated in Step 202) has successfully completed, a restoration complete message is issued. In one embodiment of the invention, the restoration complete message may be directed to the remote, master client device (or more specifically, to the restoration agent residing thereon). Further, the restoration complete message may serve as a notification indicating the completion of the restore operation performed on the local, slave client device.

In Step 212, after alternatively determining (in Step 208) that the restore operation (initiated in Step 202) is still ongoing or underway, a determination is made as to whether a current elapsed time (tracked by the operation timer initialized/started in Step 204) exceeds a threshold restoration duration. The threshold restoration duration may refer to an expected length or amount of time (e.g., sixty seconds or one minute) required for most restore operations to complete. Further, the threshold restoration duration may refer to a time value prescribed by a system administrator, or may refer to a time value derived from statistical techniques applied to a logged history of previously performed restore operations across the client device cluster. Accordingly, in one embodiment of the invention, if it is determined that the current elapsed time exceeds the threshold restoration duration, then the process proceeds to Step 220 (see e.g., FIG. 2B). On the other hand, if it is alternatively determined that the current elapsed time does not exceed the threshold restoration duration, then the process alternatively proceeds to Step 214.

In Step 214, after determining (in Step 212) that the above-mentioned current elapsed time does not exceed the threshold restoration duration (described above), a determination is made as to whether the current elapsed time matches the threshold restoration duration or matches a threshold restoration duration interval. A threshold restoration duration interval may represent a partition of the threshold restoration duration, which may be equal or unequal in length to one or more other threshold restoration duration intervals constituting the threshold restoration duration. Further, the time span of each threshold restoration duration interval may be prescribed by a system administrator based on the specified threshold restoration duration. Accordingly, in one embodiment of the invention, if it is determined that the current elapsed time matches the threshold restoration duration, or any threshold restoration duration interval, then the process proceeds to Step 216. On the other hand, if it is alternatively determined that the current elapsed time does not match the threshold restoration duration, or any threshold restoration duration interval, then the process alternatively proceeds to Step 206, where monitoring of the operation timer continues while the restore operation (initiated in Step 202) progresses.

In Step 216, after determining (in Step 214) that the above-mentioned current elapsed time matches the threshold restoration threshold, or matches any threshold restoration threshold interval, a restoration status message is issued. In one embodiment of the invention, the restoration status message may be directed to the remote, master client device (or more specifically, to the restoration agent residing thereon). Further, the restoration status message may serve to convey and, thus may include details summarizing, the current progress state of the restore operation being performed on the local, slave client device.

Turning to FIG. 2B, in Step 220, after alternatively determining (in Step 212) that the current elapsed time (tracked by the operation tinier initialized/started in Step 204) exceeds the threshold restoration duration (described above—see e.g., FIG. 2A), a determination is made as to whether the current elapsed time matches a multiple of the threshold restoration duration. A multiple of the threshold restoration duration may refer to a time value derived from the product of the threshold restoration duration and an integer greater than one. Accordingly, in one embodiment of the invention, if it is determined that the current elapsed time matches any threshold restoration duration multiple, then the process proceeds to Step 222. On the other hand, in another embodiment of the invention, if it is alternatively determined that the current elapsed time does not match any threshold restoration duration multiple, then the process alternatively proceeds to Step 206, where monitoring of the operation timer continues while the restore operation (initiated in Step 202) progresses.

In Step 222, after determining (in Step 220) that the above-mentioned current elapsed time matches any threshold restoration duration multiple, a restoration status message is generated (i.e., not issued or delivered yet). In one embodiment of the invention, the restoration status message may serve to convey and, thus may include details summarizing, the current progress state of the restore operation being performed on the local, slave client device.

In Step 224, a determination is made as to whether a message size of the restoration status message (generated in Step 222) exceeds a threshold percentage of a maximum buffer size. The aforementioned message size may refer to the amount of information, expressed in bytes, contained in the restoration status message. Further, the aforementioned maximum buffer size may refer to the maximum amount of information, expressed in bytes, which may be delivered through any given transmission directed to the remote, master client device. Subsequently, the aforementioned threshold percentage may refer to a subset amount (or fraction) (e.g., seventy-five percent) of the maximum information that may be transmitted towards the remote, master client device through any individual data transmission, which may be prescribed by a system administrator. Accordingly, in one embodiment of the invention, if it is determined that the message size exceeds the threshold percentage of the maximum buffer size, then the process proceeds to Step 228. On the other hand, in another embodiment of the invention, if it is alternatively determined that the message size does not exceed the threshold percentage of the maximum buffer size, then the process alternatively proceeds to Step 206, where monitoring of the operation timer continues while the restore operation (initiated in Step 202) progresses.

In Step 228, after determining (in Step 224) that the above-mentioned restoration status message size exceeds the specified threshold percentage of the maximum (data transmission) buffer size, a determination is made as to whether the message size exceeds the maximum buffer size. Accordingly, in one embodiment of the invention, if it is determined that the message size exceeds the maximum buffer size, then the process proceeds to Step 230. On the other hand, in another embodiment of the invention, if it is alternatively determined that the message size does not exceed the maximum buffer size, then the process alternatively proceeds to Step 226.

In Step 230, after determining (in Step 228) that the above-mentioned restoration status message size exceeds the maximum (data transmission) buffer size, the restoration status message (generated in Step 222) is partitioned. Specifically, in one embodiment of the invention, the restoration status message may be segmented into multiple restoration status message blocks. Each restoration status message block may be capped to contain the amount of information, expressed in bytes, equivalent to the maximum buffer size. That is, the block size of each restoration status message block may be configured to not exceed the maximum buffer size.

In Step 232, the restoration status message blocks (obtained through partitioning of the restoration status message in Step 230) are individually and sequentially transmitted to the remote, master client device (or more specifically, to the restoration agent residing thereon). Thereafter, the process proceeds to Step 206, where monitoring of the operation timer continues while the restore operation (initiated in Step 202) progresses.

In Step 226, after alternatively determining (in Step 228) that the above-mentioned restoration status message size does not exceed the maximum (data transmission) buffer size, the restoration status message (generated in Step 222) is transmitted to the remote, master client device (or more specifically, to the restoration agent residing thereon). Thereafter, the process proceeds to Step 206, where monitoring of the operation timer continues while the restore operation (initiated in Step 202) progresses.

Figure 3:
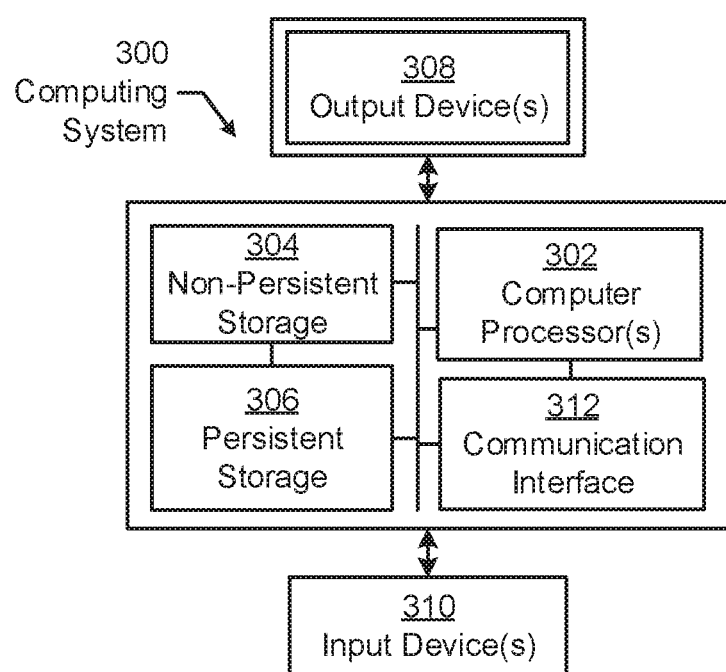
FIG. 3 shows a computing system in accordance with one or more embodiments of the invention.

FIG. 3 shows a computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), Output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other Output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resource-efficient messaging, comprising:
   receiving a restoration instruction from a remote client device;
   initiating, on a local client device, a restore operation in response to the restoration instruction;
   monitoring a timer tracking an elapsed time since an initiation of the restore operation;
   making a first determination that the elapsed time matches one selected from a group consisting of a threshold restoration duration and a threshold restoration duration interval;
   based on the first determination:
      generating a first restoration status message; and
      transmitting the first restoration status message to the remote client device.

2. The method of claim 1, wherein the restore operation comprises performing a data transfer from a backup storage system to the local client device.

3. The method of claim 1, wherein the first restoration status message comprises a state of the restore operation at the elapsed time.

4. The method of claim 1, wherein the threshold restoration duration is one minute.

5. The method of claim 1, further comprising:
   making a second determination that the elapsed time exceeds the threshold restoration duration and is a multiple of the threshold restoration duration; and
   generating, based on the second determination, a second restoration status message.

6. The method of claim 5, further comprising:
   making a third determination that a message size of the second restoration status message is below a threshold percentage of a maximum buffer size; and discarding, based on the third determination, the second restoration status message.

7. The method of claim 5, further comprising:
making a third determination that a message size of the second restoration status message exceeds a threshold percentage of a maximum buffer size and does not exceed the maximum buffer size; and
transmitting, based on the third determination, the second restoration status message to the remote client device.

8. The method of claim 5, further comprising:
making a third determination that a message size of the second restoration status message exceeds a maximum buffer size;
based on the third determination:
partitioning the second restoration status message into a plurality of restoration status message blocks; and
transmitting the plurality of restoration status message blocks to the remote client device.

9. A system, comprising:
a first client device comprising a first computer processor configured to:
receive a restoration instruction;
initiate, on the first client device, a restore operation in response to the restoration instruction;
monitor a timer tracking an elapsed time since an initiation of the restore operation;
make a determination that the elapsed time matches one selected from a group consisting of a threshold restoration duration and a threshold restoration duration interval;
based on the determination:
generate a restoration status message; and
transmit the restoration status message.

10. The system of claim 9, wherein the first client device is one selected from a group consisting of a desktop computer, a laptop computer, a tablet computer, a server, and a mainframe.

11. The system of claim 9, further comprising:
a second client device comprising a second computer processor operatively connected to the first client device,
wherein the restoration instruction is received from the second client device,
wherein the restoration status message is transmitted to the second client device.

12. The system of claim 11, further comprising:
a backup storage system operatively connected to the first client device and the second client device,
wherein the restore operation comprises performing a data transfer from the backup storage system to the first client device.

13. A non-transitory computer readable medium (CRM) comprising computer readable program code, which when executed by a computer processor, enables the computer processor to:
receive a restoration instruction from a remote client device;
initiate, on a local client device, a restore operation in response to the restoration instruction;
monitor a timer tracking an elapsed time since an initiation of the restore operation;
make a first determination that the elapsed time matches one selected from a group consisting of a threshold restoration duration and a threshold restoration duration interval;
based on the first determination:
generate a first restoration status message; and
transmit the first restoration status message to the remote client device.

14. The non-transitory CRM of claim 13, wherein the restore operation comprises performing a data transfer from a backup storage system to the local client device.

15. The non-transitory CRM of claim 13, wherein the first restoration status message comprises a state of the restore operation at the elapsed time.

16. The non-transitory CRM of claim 13, wherein the threshold restoration duration is one minute.

17. The non-transitory CRM of claim 13, further comprising computer readable program code, which when executed by the computer processor, enables the computer processor to:
make a second determination that the elapsed time exceeds the threshold restoration duration and is a multiple of the threshold restoration duration; and
generate, based on the second determination, a second restoration status message.

18. The non-transitory CRM of claim 17, further comprising computer readable program code, which when executed by the computer processor, enables the computer processor to:
make a third determination that a message size of the second restoration status message is below a threshold percentage of a maximum buffer size; and
discard, based on the third determination, the second restoration status message.

19. The non-transitory CRM of claim 17, further comprising computer readable program code, which when executed by the computer processor, enables the computer processor to:
make a third determination that a message size of the second restoration status message exceeds a threshold percentage of a maximum buffer size and does not exceed the maximum buffer size; and
transmit, based on the third determination, the second restoration status message to the remote client device.

20. The non-transitory CRM of claim 17, further comprising computer readable program code, which when executed by the computer processor, enables the computer processor to:
make a third determination that a message size of the second restoration status message exceeds a maximum buffer size;
based on the third determination:
partition the second restoration status message into a plurality of restoration status message blocks; and
transmit the plurality of restoration status message blocks to the remote client device.

* * * * *